(No Model.)
J. COCKFIELD & C. D. HIGGINS.
ROD PACKING.
No. 400,438. Patented Apr. 2, 1889.
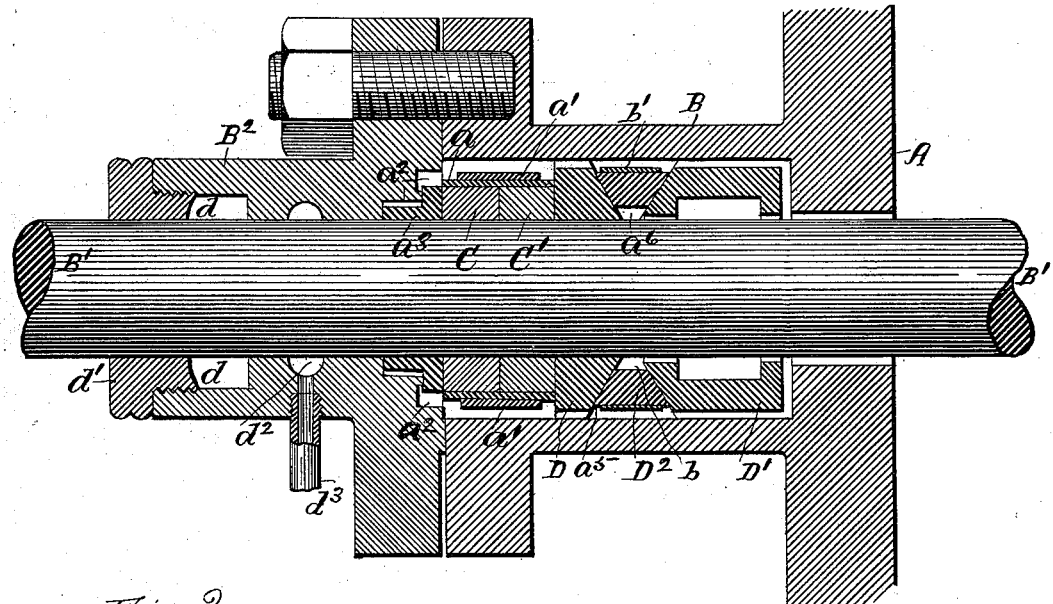
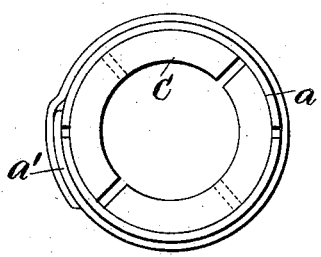
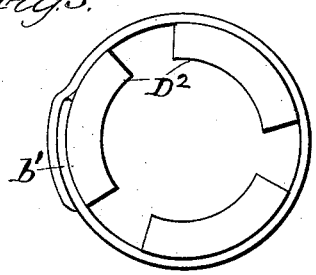
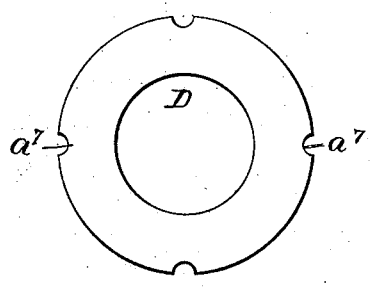
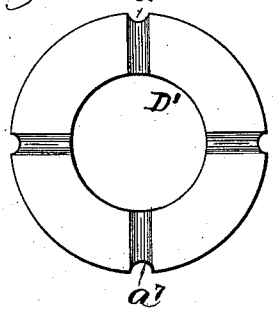
Witnesses:
Chas. E. Taylor.
J. B. Donaldson.
Inventor:
Jos. Cockfield.
C. D. Higgins.
By L. B. Coupland & Co
Attys.

UNITED STATES PATENT OFFICE.

JOSEPH COCKFIELD AND CLINTON D. HIGGINS, OF BOONE, IOWA.

ROD-PACKING.

SPECIFICATION forming part of Letters Patent No. 400,438, dated April 2, 1889.

Application filed October 23, 1888. Serial No. 288,895. (No model.)

*To all whom it may concern:*

Be it known that we, JOSEPH COCKFIELD and CLINTON D. HIGGINS, of Boone, county of Boone, and State of Iowa, have invented certain new and useful Improvements in Metallic Packing for Piston and Valve Rods, of which the following is a full, clear, and exact description, that will enable others to make and use the same, reference being had to the accompanying drawings, forming a part of this specification.

The object of this invention is to provide a metallic packing for the piston-rods and valve-stems of steam-engines, and is more especially intended for use on locomotive-engines, the same consisting of certain novel features in the construction and arrangement of the different parts, as will be hereinafter set forth.

Figure 1 is a longitudinal section showing the relative position of the packing, the stuffing-box, and the rod passing through the same; Fig. 2, a side elevation of one of the packing-rings proper; Figs. 3, 4, and 5, details of a number of backing or filling rings used in connection with the packing-rings proper.

In the drawings, A may represent the end of a steam-cylinder; B, the stuffing-box; B', the piston or valve rod, and $B^2$ the packing-gland.

The packing proper consists of two rings, C C', which are exact duplicates, and may be composed of any suitable metal. These rings are in two sections or halves, being divided transversely, and when in use are placed on the rod in such manner with reference to each other as to break joints, as indicated by dotted lines in Fig. 2. The two companion rings C C' are inclosed by a thinner and lighter ring, $a$, which is of the width equal to that of both the packing-rings. The ring $a$ is also in two parts, and when placed in position for use the adjacent ends are some distance apart, as are also the sectional ends of the packing-rings C C'. An outer open overlapping ring or band, $a'$, encompasses the whole of the packing-body proper. This open band will ordinarily be composed of spring-steel, and is of less width than the middle ring, $a$, and serves the purpose of retaining the sectional rings in their proper position with reference to the rod. The pressure of the steam keeps the rings set up to a close bearing on the rod and compensates for the gradual wear of the bearing-surfaces. The sectional rings and inclosing-band may be of any desired dimensions or proportions with reference to each other.

The gland $B^2$ is provided on the inner end with an annular recess, $a^2$, in which is loosely inserted the flanged sleeve $a^3$, inclosing the rod and having a close bearing on the edge of the packing-ring adjacent thereto and forming a steam-tight joint. The recess $a^2$ corresponds to the contour of the sleeve and its flange, sufficient space being left all around, so that the sleeve will have play enough in its seat to conform to the vibration of the piston or valve-rod.

In the rear of the packing-rings are located the backing or filling rings, consisting, first, of the solid ring D, having a flat bearing-edge on that side next to the packing-rings and beveled on the opposite or inner edge, as at $a^5$. A companion ring, D', is located just back of the ring D, and is the bottom ring in the stuffing-box. The edge of the ring D' adjacent to the beveled edge of the companion ring is correspondingly beveled, thus forming a V-shaped groove, $a^6$, between the two rings. The grooves at $a^7$ in the rings D D' provide passages for steam and the product thereof.

$D^2$ is an open ring which will ordinarily be in three parts, leaving some considerable space between each section, as shown in Fig. 3. This ring is beveled on both edges to correspond to and fit in the grooves between the edges of the companion rings D D'. An annular space, $b$, is left between the inner circumferential surface of this sectional ring and the rod, so as to permit of a wedging action, and thereby confine the packing to a close lateral bearing. An open spring-ring, $b'$, incloses the sectional ring $D^2$, and holds the same in a proper wedging position relative to the rings B D', between the beveled ends of which the same is inserted, as shown in Fig. 1. Space is left between the series of rings and the inclosing stuffing-box to allow a lateral play without binding, and also permit a free entrance of the steam around the outside to exert the required pressure.

The packing-gland is provided in the outer end with the chamber $d$ for the insertion of a quantity of waste or other suitable substance for the purpose of wiping or freeing the rod from dust and dirt before it comes in contact with the packing-surfaces. The chamber $d$ is closed by means of the movable screw-cap $d'$. A second and smaller chamber, $d^2$, and the drip or waste pipe $d^3$, communicating therewith, provides for the escape of the products of condensation.

Having thus described our invention, what we claim, and desire to secure by Letters Patent, is—

1. The combination, with the companion packing-rings, of the backing or filling rings D D', having the adjacent edges beveled, as described, the sectional ring $D^2$, beveled on both edges to correspond to and wedge in between the rings D D', and the compressing-ring $b'$, inclosing the ring $D^2$, substantially as and for the purpose set forth.

2. In the metallic packing, the combination of the following elements: the companion sectional packing-rings, the sectional ring $a$, inclosing said packing-rings, a ring or spring band encircling the ring $a$, a gland having a recess on the inner end, a flange-sleeve seated in said recess, the backing-rings D D', having the joining edges beveled to form a V-shaped groove between the same, the ring $D^2$, correspondingly beveled on both edges to wedge into said groove, and the spring-compressing ring $b'$, inclosing the sectional ring $D^2$, substantially as and for the purpose set forth.

JOS. COCKFIELD.
CLINTON D. HIGGINS.

Witnesses:
W. G. COLEMAN,
CHAS. R. CARLSON.